United States Patent [19]

Numazawa et al.

[11] Patent Number: 4,739,864
[45] Date of Patent: Apr. 26, 1988

[54] ELECTROMAGNETIC POWDER CLUTCH FOR USE IN A POWER TRANSMITTING SYSTEM HAVING AN AUTOMATICALLY OPERATED CONSTANT-MESH TRANSMISSION

[75] Inventors: Akio Numazawa, Nagoya; Akira Sato, Susono; Fumihiro Ushijima, Okazaki; Hideaki Matsui, Gotenba, all of Japan

[73] Assignee: Toyota Jidosha Kabushiki Kaisha, Aichi, Japan

[21] Appl. No.: 917,954

[22] Filed: Oct. 14, 1986

[30] Foreign Application Priority Data

Oct. 17, 1985 [JP] Japan .................................. 60-231876
Oct. 17, 1985 [JP] Japan ........................... 60-159035[U]

[51] Int. Cl.$^4$ ........................ F16D 37/02; B60K 41/22
[52] U.S. Cl. .................................. 192/3.56; 192/3.61; 192/21.5; 192/106.1; 192/113 A
[58] Field of Search ............... 192/21.5, 113 A, 106.1, 192/3.54, 3.56, 3.61

[56] References Cited

U.S. PATENT DOCUMENTS

| | | | |
|---|---|---|---|
| 2,818,148 | 12/1957 | Winther | 192/21.5 |
| 2,822,070 | 2/1958 | Jaeschke | 192/21.5 |
| 2,870,642 | 1/1959 | Randol | 192/21.5 X |
| 2,870,888 | 1/1959 | Gill, Jr. | 192/21.5 |
| 2,921,657 | 1/1960 | Winther | 192/21.5 |
| 3,727,431 | 4/1973 | Yokel | 192/113 A X |
| 3,768,276 | 10/1973 | Caldwell et al. | 192/113 A X |
| 4,085,344 | 4/1978 | Eddens | 192/113 A X |
| 4,570,765 | 2/1986 | Makita | 192/21.5 X |
| 4,616,740 | 10/1986 | Okamoto et al. | 192/21.5 |

FOREIGN PATENT DOCUMENTS

| | | | |
|---|---|---|---|
| 61830 | 4/1982 | Japan | 192/113 A |
| 146925 | 8/1985 | Japan | 192/113 A |
| 694898 | 7/1953 | United Kingdom | 192/21.5 |
| 788176 | 12/1957 | United Kingdom | 192/21.5 |

Primary Examiner—Rodney H. Bonck
Assistant Examiner—Richard M. Lorence
Attorney, Agent, or Firm—Parkhurst & Oliff

[57] ABSTRACT

An automatic power transmitting system for an automotive vehicle, wherein the operation of an electromagnetic clutch is automatically controlled in response to automatic shifting actions of a constant-mesh transmission by synchromesh devices. The powder clutch includes a driving rotor unit having an outer yoke and an inner yoke which cooperate to define therebetween an annular space in which a thin-walled cylindrical member of a driven rotor unit is disposed, such that the cylindrical member cooperates with at least one of the outer and inner yokes to define at least one powder gap. A small thickness of the cylindrical member assures a minimum of rotational energy consumption by the synchromesh devices. A damper may be disposed so as to connect the driven rotor unit and the input shaft of the constant-mesh transmission, so as to provide a damping effect for preventing a rapid change in an amount of torque transmitted from the driven rotor unit to the input shaft.

3 Claims, 3 Drawing Sheets

ELECTROMAGNETIC POWDER CLUTCH FOR USE IN A POWER TRANSMITTING SYSTEM HAVING AN AUTOMATICALLY OPERATED CONSTANT-MESH TRANSMISSION

BACKGROUND OF THE INVENTION

1. Field of the Invention

The present invention relates to an automatic power transmitting system for an automotive vehicle, which uses an automatically operated constant-mesh transmission with synchromesh devices.

2. Discussion of the Prior Art

As an automatic power transmitting system for motor vehicles, there is known a system which incorporates a transmission wherein a hydraulically operated frictional coupling device is provided to bring component elements of a planetary gear mechanism into mutual engagement with each other, or into engagement with a housing body, thereby enabling the transmission to achieve automatic shifts to suitable drive positions of the transmission. In this type of automatic power transmitting system, the input shaft of the transmission is generally connected to the crankshaft of the engine of the vehicle via a fluid coupling clutch. Because of a slip in the fluid coupling clutch, a vehicle employing an automatic transmission of the type indicated above inevitably suffers from a low level of fuel economy, as compared with a vehicle using a conventional manual transmission. It is also known in the art to provide a fluid coupling with a lock-up device. However, the operational application of such a lock-up clutch is usually limited to some of the gear positions of the transmission. Thus, the use of a lock-up device will not completely overcome the drawback of the above-indicated type of automatic transmitting system, from the standpoint of the fuel economy or specific fuel consumption of the vehicle.

To solve the above drawback, it is considered to use an automatic power transmitting system incorporating an assembly of an electromagnetic powder clutch connected to the engine of a vehicle, and a constant-mesh transmission whose gear shifting operations are automatically effected by a suitable actuator. The engaging and disengaging actions of the powder clutch are controlled in response to the operation of the constant-mesh transmission. This automatic power transmitting system appears to provide at least the same level of fuel economy as a manually operated transmission system. However, the power transmitting system in question has other drawbacks. Described more specifically, an electromagnetic powder clutch usually has a driving rotor in which a relatively large-sized annular coil is embedded, and a driven rotor which cooperates with the driving rotor to define a gap for accommodating a magnetic powder, and to produce a magnetic path for connecting the two rotors through the magnetic powder. The driven rotor is commonly formed from a relatively thick-walled member, for assuring a sufficient area of the magnetic path to be produced. Accordingly, the moment of inertia of the driven rotor and consequently that of the input shaft of the constant-mesh transmission coupled to the driven rotor tend to be relatively high. This indicates a large amount of rotational energy consumption in synchromesh devices that are provided for synchronizing the speeds of two rotating members of the constant-mesh transmission upon shifting actions to select the desired drive position. Therefore, the synchronizing actions or shifting actions take a comparatively long time, resulting in deteriorating the drivability of the vehicle. On the other hand, an attempt to reduce the shifting time will lead to lowering the durability of the synchromesh devices.

SUMMARY OF THE INVENTION

It is therefore an object of the present invention to provide an automatic power transmitting system for an automotive vehicle having a constant-mesh transmission with synchromesh devices, which is durable in operation and which permits improved fuel economy and drivability of the vehicle.

According to one aspect of the present invention, there is provided an automatic power transmitting system for an automotive vehicle, wherein an input shaft of a constant-mesh transmission with at least one synchromesh device is connected to a crankshaft of an engine of the vehicle via an electromagnetic powder clutch, and wherein engaging and disengaging actions of the electromagnetic powder clutch are automatically controlled in response to automatic shifting actions of the constant-mesh transmission by the at least one synchromesh device, the power transmitting system being characterized by the electromagnetic powder clutch which includes a coil, a driving rotor unit and a driven rotor unit. The driving rotor unit has an outer yoke and an inner yoke which are fixed to the crankshaft of the engine and which cooperate to define therebetween an annular space that is exposed to a magnetic path formed upon energization of the coil. The driven rotor unit includes a cylindrical member which is operatively connected to the input shaft of the constant-mesh transmission. The cylindrical member is disposed between the outer and inner yokes such that the cylindrical member cooperates with at least one of the outer and inner yokes to define at least one gap for accommodating a magnetic powder which operatively connects the driving rotor unit to the cylindrical member upon exposure of the magnetic power to the magnetic path. A wall thickness of the cylindrical member being selected so that a moment of inertia of the input shaft of the constant-mesh transmission is small enough to effect the shifting actions with a minimum of rotational energy consumption by the at least one synchromesh device.

In the automatic power transmitting system of the present invention constructed as described above, the shifting actions of the constant-mesh transmission by the at least one synchromesh device may be accomplished in a relatively short period of time and with minimum consumption of a rotational energy by the at least one synchromesh device. Consequently, the drivability of the vehicle and the durability of the synchromesh device or devices may be accordingly improved.

According to one advantageous feature of the above aspect of the present invention, the electromagnetic powder clutch further includes a damper which is disposed between the driven rotor unit and the input shaft of the constant-mesh transmission, for preventing a rapid change in an amount of torque that is transmitted from the driven rotor unit to the input shaft of the constant-mesh transmission. In this arrangement wherein the input shaft of the constant-mesh transmission is connected to the driven rotor unit of the powder clutch by the damper disposed within the powder clutch, the length of the input shaft of the constant-mesh transmission may be made smaller than that where a damper device is disposed on one side of the driven rotor unit on the side of the crankshaft of the engine. Thus, the moment of inertia of the input shaft of the constant-mesh transmission may be further reduced, resulting in a further decrease in the rotational energy consumption by the synchromesh device or devices of the transmission, which indicates a shorter shifting time for changing the drive gear position of the transmission. Accordingly, the vehicle drivability and the durability of the synchromesh devices may be further improved.

According to another aspect of the present invention, there is provided an automatic power transmitting system for an automotive vehicle, including an electromagnetic powder clutch, and a constant-mesh transmission which has an input shaft connected by the electromagnetic powder clutch to an engine of the vehicle, and at least one synchromesh device operable by a shift actuator for effecting shifting actions of the constant-mesh transmission. The electromagnetic powder clutch comprises: (a) a driving rotor unit connected to a crankshaft of the engine; (b) a driven rotor unit rotatable relative to the driving rotor unit, and cooperating with the driving rotor unit to define a gap for accommodating a magnetic powder; and (c) a damper connecting the driven rotor unit and the input shaft of the constant-mesh transmission, so as to provide a damping effect for preventing a rapid change in an amount of torque that is transmitted from the driven rotor unit to the input shaft.

In the automatic power transmission system of the invention described above, the damper is disposed between the driven rotor unit of the powder clutch and the input shaft of the constant-mesh transmission, for preventing an abrupt variation in the torque transmitted from the powder clutch to the constant-mesh transmission. According to this arrangement, the length of the input shaft of the constant-mesh transmission may be made smaller than that where a damper is provided on one side of the driven rotor unit on the side of the crankshaft of the engine. Therefore, the moment of inertia of the input shaft may be reduced, and the shifting actions by the synchromesh device or devices may be achieved in a shorter time. Thus, the power transmitting system is improved in terms of the vehicle drivability, and in the durability of the synchromesh devices of the constant-mesh transmission.

In one advantageous form of the above aspect of the invention, the driving rotor unit comprises a cooling fin which produces a flow of a cooling air into and through the electromagnetic powder clutch due to a centrifugal force produced by rotation of the cooling fin with the driving rotor unit, and further comprises a hole through which the cooling air is discharged out of the electromagnetic powder clutch. The damper is located so as to be exposed to an upstream portion of the flow of the cooling air through the powder clutch, so that the damper may be effectively cooled. Hence, the damper is suitably protected from deterioration or denaturation of its elastic member due to heat generated within the powder clutch.

BRIEF DESCRIPTION OF THE DRAWINGS

The foregoing and other objects, features and advantages of the present invention will become more apparent by reading the following detailed description of a preferred embodiment of the invention, when considered in conjunction with the accompanying drawings, in which.

DETAILED DESCRIPTION OF THE PREFERRED EMBODIMENT

Figure 1:
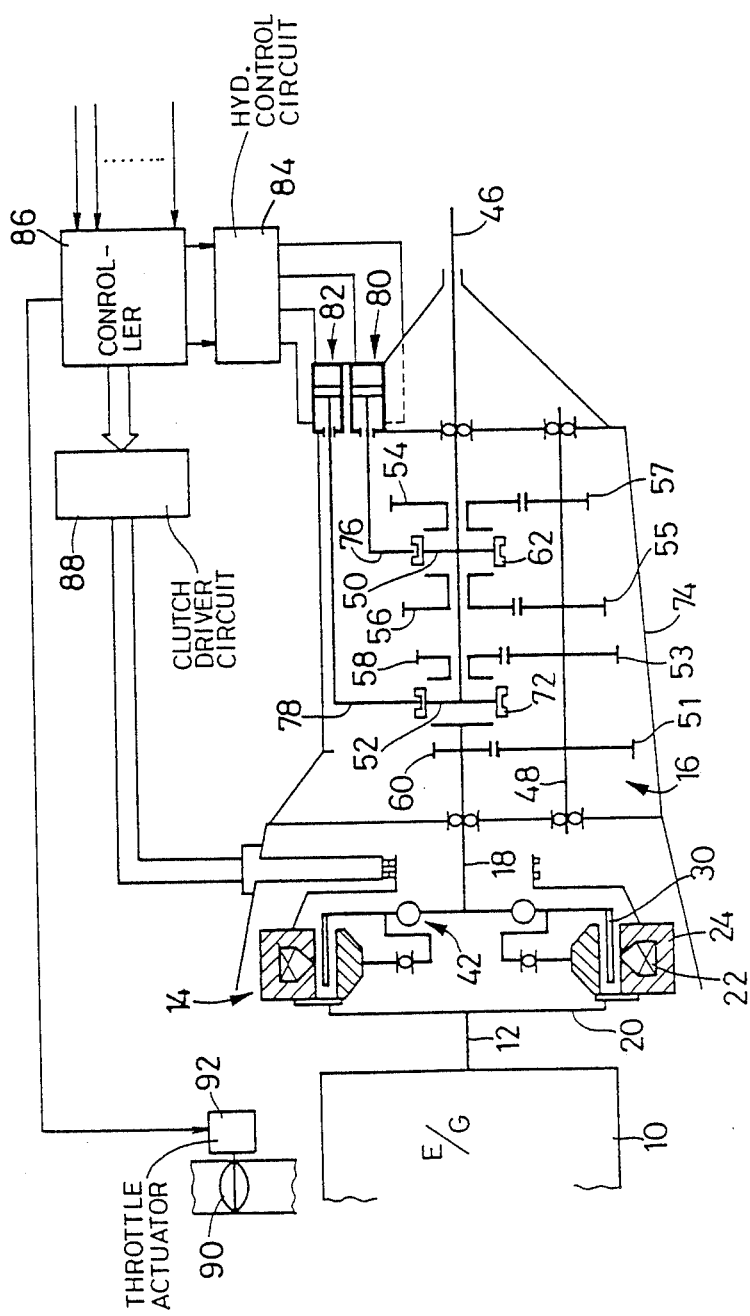
FIG. 1 is a schematic view of one embodiment of an automatic power transmitting system of the invention.

Referring first to FIG. 1, there is shown an automatic power transmitting system for an automotive vehicle, wherein an output of an engine 10 of the vehicle is transmitted to drive wheels of the vehicle, through a crankshaft 12 of the engine 10, an electromagnetic powder clutch 14, a constant-mesh transmission 16 and a differential gear not shown.

Figure 2:
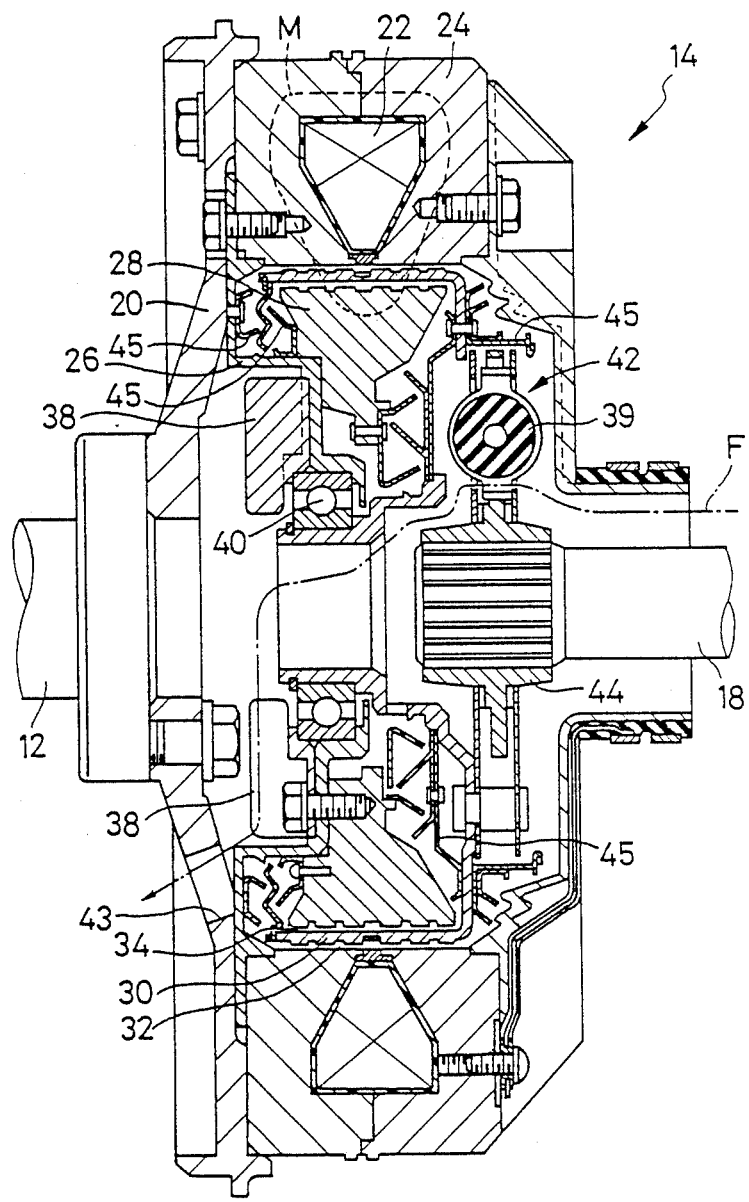
FIG. 2 is an elevational view in cross section of an electromagnetic powder clutch incorporated in the power transmitting system of FIG. 1.

The electromagnetic powder clutch 14 is disposed between the crankshaft 12 and an input shaft 18 of the constant-mesh transmission 16 as indicated in FIG. 1, and has a double-gap construction as shown in detail in FIG. 2. The powder clutch 14 includes a relatively thick-walled, cylindrical outer yoke 24 which incorporates an annular coil 22. The outer yoke 24 is connected to the crankshaft 12 by a generally disc-like first connecting member 20 secured to the two members 12, 24. Radially inwardly of the outer yoke 24, there is disposed an inner yoke 28 whose outer surface cooperates with the inner surface of the outer yoke 24 to define an annular space therebetween. This inner yoke 28 is secured by a second connecting member 26 to the first connecting member 20. The first and second connecting members 20, 26, and the outer and inner yokes 24, 28, cooperate with each other to constitute a driving rotor unit.

In the annular space formed between the outer and inner yokes 24, 28, there is received a relatively thin-walled, cylindrical member 30 which forms a part of a driven rotor unit. The cylindrical member 30 cooperates with the outer yoke 24 to define an outer annular gap 32, and with the inner yoke 28 to define an inner annular gap 34. These outer and inner gaps 32, 34 accommodate a magnetic powder (not shown) whose particles are tightly bonded together when they are exposed to a magnetic circuit or path M (FIG. 2) that is formed upon energization of the annular coil 22. Thus, the torque received by the driving rotor unit (20, 24, 26, 28) is transmitted to the cylindrical member 30 via the magnetic powder.

The cylindrical member 30 is supported by a bearing 40, rotatably relative to the driving rotor unit. A rotary motion of the cylindrical member 30 is imparted to the input shaft 18 of the constant-mesh transmission 16, via a damper 42, and a clutch hub 44 splined on the input shaft 18. The damper 42 is provided to absorb shocks produced upon engagement of the powder clutch 14. Reference numeral 45 designate labyrinth members for enclosing the magnetic powder within the outer and inner gaps 32, 34.

The second connecting member 26 has a cooling fin 38 fixed thereto. As shown in FIG. 2, the cooling fin 38 is located on the axial side of the cylindrical member 30 which is remote from the damper 42. With a centrifugal force produced by the rotation of the fin 38 by the crankshaft 12, there arises a flow of a cooling air through the powder clutch 14, as indicated at F in FIG.

2. The cooling air is discharged through a hole 43 formed in a relatively radially outer portion of the first connecting member 20. In this manner, the electromagnetic powder clutch 14 is cooled. Since the damper 42 is disposed on the side of the constant-mesh transmission 16, that is, located so that it is exposed to a relatively upstream portion of the air flow F, so that cooling air passes radially inward of the bearing 40 past a point between the damper 42 and the hub 44 whereby a shock absorbing elastic member 39 of the damper 42 is effectively protected from deterioration or denaturation due to heat generated by the clutch 14.

As depicted in FIG. 1, the constant-mesh transmission 16 includes an output shaft 46 coaxial with the input shaft 18, and a countershaft 48 which is disposed parallel to the input and output shafts 18, 46 and rotated by the input shaft 18. The output shaft 46 is formed with a first integral hub 50 at an intermediate portion thereof, and a second integral hub 52 at one of its opposite ends. At the portions of the output shaft 46 on the opposite sides of the first hub 50, there are mounted a first and a second gear 54, 56 such that these gears 54, 56 can freely spin on the output shaft 46. A third gear 58 is mounted at an end portion of the output shaft 46 near the second hub 52, such that the third gear 58 can freely spin on the output shaft 46. Further, a fourth gear 60 is fixed to an end portion of the input shaft 18 near the second hub 52. The fourth gear 60 fixed on the input shaft 18 is held in mesh with a gear 51 fixed on the countershaft 48. Also fixed on the countershaft 48 are gears 53, 55 and 57 which are in constant mesh with the third, second and first gears 58, 56 and 54 on the output shaft 46, respectively. With the countershaft 48 rotated by the input shaft 18 through the gears 60, 51, the third, second and first gears 58, 56 and 54 are rotated by the respective three gears 53, 55 and 57, at different speeds that are lower than the speed of the fourth gear 60. The rotating speeds of the third, second and first gears 58, 56, 54 decrease in the order of description.

Figure 3:
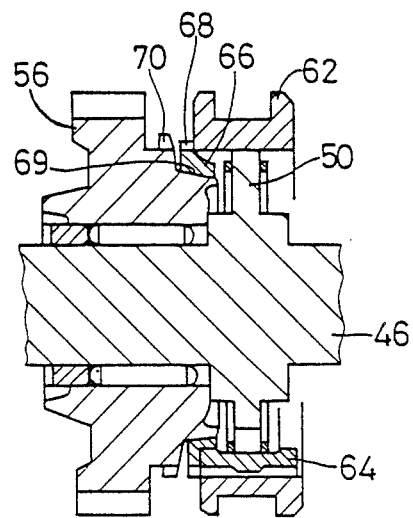
FIG. 3 is a fragmentary elevational view in cross section showing a synchromesh device of a constant-mesh transmission incorporating in the power transmitting system of FIG. 1.

As illustrated in FIG. 3, the output shaft 46 is provided with a first sleeve 62 which is fitted on the first hub 50 by means of a spline such that the sleeve 62 is axially slidable relative to the output shaft 46, but not rotatable relative to the same. When the first sleeve 62 is moved to toward the rotating second gear 56, the corresponding end of a key 64 formed on the inner surface of the first sleeve 62 comes into pressed contact with a chamfered portion 68 of a synchronizer ring 66, thereby forcing the inner surface of the synchronizer ring 66 against a coned portion 69 of the second gear 56. As a result of frictional engagement of the synchronizer ring 66 with the coned portion 69, the first hub 50 is rotated until the rotational motions of the first hub 50 and the second gear 56 are synchronized with each other. Then, the first sleeve 62 is further moved toward the second gear 56, whereby the first sleeve 62 is finally brought into engagement wtih a gear piece 70 provided on the second gear 56. Another synchronizer ring (not shown) identical to the synchronizer ring 66 is provided on the side of the first gear 54, for connecting the first gear 54 to the output shaft 46. Thus, the first hub 50, the first sleeve 62 with the key 64, the synchronizer ring 66, the gear piece 70 on the second gear 56, and the other synchronizer ring and gear piece for the first gear 54, constitute a first synchromesh device which is operable to connect the first or second gear 54, 56 to the first hub 50 of the output shaft 46, for establishing a first-speed or second-speed gear position of the constant-mesh transmission 16.

Referring back to FIG. 1, the constant-mesh transmission 16 has a second synchromesh device including a second sleeve 72 associated with the second hub 52, which has the same arrangement as the first synchromesh device for the first hub 50. Axial movements of the second sleeve 72 on the second hub 52 will cause either the second gear 58 or the fourth gear 60 to be connected to the second hub 52, thereby establishing a third-speed or fourth-speed gear position.

The first and second sleeves 62, 72 are driven by a first and a second hydraulic cylinder 80, 82, through respective shifter forks 76, 78, respectively. The first and second hydraulic cylinders 80, 82 are supported by a housing 74 of the constant-mesh transmission 16, and are controlled by a controller 86 via a hydraulic control circuit 84. The controller 86 also controls the electromagnetic clutch 14, via a clutch driver circuit 88. More specifically, an electric current to be supplied by the driver circuit 88 is controlled by the controller 86. The engine 10 is provided with a throttle valve 90 disposed in the intake manifold. The throttle valve 90 is operated by a throttle actuator 92 that is controlled by the controller 86.

The controller 86 consists of a microcomputer which includes a central processing unit, a read-only memory and a random-access memory. The controller 86 is adapted to receive from various sensors various signals such as an accelerator signal indicative of an amount of depression of an accelerator pedal, a vehicle-speed signal indicative of a running speed of the vehicle, an engine-speed signal indicative of a running speed of the engine 10, and a shift-position signal indicative of a currently selected position of a gearshift lever for the constant-mesh transmission 16. The central processing unit of the controller 86 processes the received signals according to control programs stored in the read-only memory, while utilizing a temporary storage function of the random-access memory, in order to control the opening of the throttle valve 90, the engaging and disengaging actions of the electromagnetic powder clutch 14, the shifting actions of the constant-mesh transmission 16, etc. Described in more detail, the central processing unit determines a drive gear position of the transmission 16, based on the vehicle speed and the amount of depression of the accelerator pedal, and according to a predetermined relation stored in the read-only memory. To establish the determined drive gear position of the transmission 16, the central processing unit executes a predetermined gear shift routine consisting of a series of control steps. For example, if the central processing unit has determined to shift up the constant-mesh transmission 16 from its first-speed gear position to its second-speed gear position, the throttle actuator 92 is first operated to fully close the throttle valve 90, and disengage the electromagnetic powder clutch 14. Then, the first hydraulic cylinder 80 is actuated to place the first sleeve 62 in its neutral position, which first sleeve 62 has been in engagement with the first gear 54 to establish the first-speed gear position. The first hydraulic cylinder 80 is further actuated to move the first sleeve 62 into engagement with the second gear 56, in order to establish the second-speed gear position. Subsequently, the throttle valve 90 is returned to a position corresponding to the current position of the accelerator pedal, and at the same time the powder clutch 14 is again engaged.

As exemplified above, the constant-mesh transmission 16 is automatically shifted up or down depending upon the specific running conditions of the vehicle. In the present embodiment wherein the cylindrical member 30 serving as a driven rotor of the powder clutch 14 is considerably thin-walled, the moment of inertia of the input shaft 18 of the transmission 16 is made comparatively small, whereby the consumption of rotational energy during shifting actions of the transmission 16 is held to a minimum. In the case where the transmission 16 is shifted up to the second-speed gear position, a reduced amount of energy is consumed due to friction between the inner surface of the synchronizer ring 66 of the first synchromesh device and the outer surface of the coned portion 69 of the second gear 56. Consequently, the gear shifting time is accordingly reduced, and the drivability of the vehicle is improved. Further, the required mass of the driven rotor 30 of the powder clutch 14 contributes to increasing the durability of the synchromesh devices of the constant-mesh transmission 16.

In the illustrated embodiment, the damper 42 is disposed in the electromagnetic powder clutch 14 such that the damper 42 connects the cylindrical member 30 to the input shaft 18 of the constant-mesh transmission 16. This arrangement makes it possible to reduce the length of the input shaft 18, thereby permitting further reduction in the rotational energy that is consumed by the first or second synchromesh device during a shifting operation of the transmission 16. Hence, the present embodiment is further enhanced in terms of the shifting time of the transmission, durability of the synchromesh devices, and drivability of the vehicle.

Further, since the damper 42 in the powder clutch 14 is exposed to an upstream portion of the cooling air flow F due to a centrifugal force produced by the rotation of the fin 38, the elastic member 39 of the damper 42 is effectively cooled and is thus suitably protected against deterioration of denaturation due to heat within the powder clutch 14. This arrangement contributes to improvement in the durability of the damper 42. According to an experiment on the powder clutch 14 under a given operating condition, the temperature at the damper 42 was held at about 100° C. or lower, while the temperatures in the outer and inner gaps 32, 34 and at the first connecting member 26 (on the side of the engine 10) were about 250° C. and 120°–130° C., respectively. In this connection, it is desirable that a synthetic rubber forming the elastic member 39 be held below 120° C., preferably below 100° C., approximately.

While the present invention has been described in its preferred embodiment referring to the accompanying drawings, it is to be understood that the invention may be otherwise embodied.

For example, while the constant-mesh transmission 16 used in the illustrated embodiment has four forward drive gear positions, it is possible to use a constant-mesh transmission which has three, or five or more forward drive gear positions.

Although the powder clutch 14 used in the illustrated embodiment has a double-gap structure having the two gaps 32, 34 for accommodating a magnetic powder, the advantage according to one aspect of the invention may be enjoyed even where a powder clutch has a single gap, provided that the driven rotor (30) connected to the input shaft 18 of the constant-mesh transmission 16 is formed of a thin-walled cylindrical member having a considerably reduced moment of inertia.

However, the advantage according to another aspect of the invention may be offered even where the driven rotor of the powder clutch 14 is formed of a relatively thick-walled cylindrical member, provided that the damper 42 is disposed between the driven rotor of the powder clutch and the input shaft 18 of the constant-mesh transmission 16. Namely, the damper 42 between the driven rotor 30 and the input shaft 18 makes it possible to reduce the length of the input shaft 18, thereby contributing to reducing the moment of inertia of the input shaft 18.

It will be obvious to those skilled in the art that other changes, modifications and improvements may be made in the invention, without departing from the spirit and scope of the invention defined in the following claims.

What is claimed as new and desired to be secured by Letters Patent of the United States is:

1. An automatic power transmitting system for an automotive vehicle with an engine having a crankshaft, including (a) an electromagnetic powder clutch connected to said crankshaft, (b) a constant-mesh transmission which has an input shaft connected to said electromagnetic powder clutch, and at least one synchromesh device operable to effect shifting actions of said constant-mesh transmission, and (c) a shift actuator for operating said at least one synchromesh device to effect said shifting actions, and wherein engaging and disengaging actions of said electromagnetic powder clutch are automatically controlled in response to said shifting actions of the constant-mesh transmission, said electromagnetic powder clutch comprising:

a driving rotor unit having an outer yoke and an inner yoke which are fixed to said crankshaft of said engine and which cooperate to define therebetween an annular space;

a driven rotor unit including a cylindrical member which is operatively connected to said input shaft of said constant-mesh transmission, said cylindrical member being disposed in said annular space of said driving rotor unit such that said cylindrical member cooperates with at least one of said outer and inner yokes to define at least one gap for accommodating a magnetic powder;

a coil energizable to form a magnetic path to which said magnetic powder in said at least one gap is exposed, so as to connect said driving rotor unit to said cylindrical member of the driven rotor unit, and thereby operatively connect said crankshaft to said input shaft of the constant-mesh transmission;

a damper for connecting said cylindrical member to said input shaft of the constant-mesh transmission, so as to prevent a rapid change in an amount of torque that is transmitted from said driven rotor unit to said input shaft; and said cylindrical member of the driven rotor unit having a wall thickness which is selected so that a moment of inertia of said cylindrical member connected to said input shaft is small enough to effect said shifting actions of the constantmesh transmission with a minimum of rotational energy consumption by said at least one synchromesh device, while said damper being disposed on a first axial side of said cylindrical member, said first axial side being remote from said engine, and being connected to an end of said input shaft of the constant-mesh transmission so that the length of said input shaft is reduced to minimize the moment of inertia of said input shaft and to thereby further reduce the rotational energy consumption by said at least one synchromesh device.

2. The automatic power transmitting system of claim 1, wherein said driving rotor unit comprises a cooling fin disposed on a second axial side of said cylindrical member, said second axial side being remote from said damper, said cooling fin being operable to produce a flow of cooling air into and through said electromagnetic powder clutch due to a centrifugal force produced by rotation of said cooling fin with said driving rotor unit, said electromagnetic clutch having a hole through which said cooling air is discharged out of said electromagnetic clutch, said damper being located so as to be exposed to an upstream portion of said flow of the cooling air through said powder clutch.

3. The automatic power transmitting system of claim 2, wherein said electromagnetic powder clutch further comprises a bearing for supporting said cylindrical member of the driven rotor unit rotatably relative to said driving rotor unit, and said input shaft of the constant-mesh transmission has a hub splined to said end thereof, said damper being connected to said hub, said flow of the cooling air passing a point between said damper and said hub, and a point radially inward of said bearing.

* * * * *